(12) United States Patent
Bheda et al.

(10) Patent No.: US 10,782,673 B2
(45) Date of Patent: *Sep. 22, 2020

(54) SYSTEM AND METHOD FOR ADDITIVE MANUFACTURING WITH LAYER-BY-LAYER CURING

(71) Applicant: Arevo, Inc., Santa Clara, CA (US)

(72) Inventors: Hemant Bheda, Saratoga, CA (US); Riley Reese, Carpinteria, CA (US)

(73) Assignee: Arevo, Inc., Santa Clara, CA (US)

( * ) Notice: Subject to any disclaimer, the term of this patent is extended or adjusted under 35 U.S.C. 154(b) by 197 days.

This patent is subject to a terminal disclaimer.

(21) Appl. No.: 16/040,122

(22) Filed: Jul. 19, 2018

(65) Prior Publication Data

US 2018/0329395 A1 Nov. 15, 2018

Related U.S. Application Data

(63) Continuation of application No. 15/069,440, filed on Mar. 14, 2016, now Pat. No. 10,067,499.

(60) Provisional application No. 62/133,237, filed on Mar. 13, 2015.

(51) Int. Cl.
*G05B 19/4099* (2006.01)
*B33Y 10/00* (2015.01)
*B29C 64/118* (2017.01)

(52) U.S. Cl.
CPC ........ *G05B 19/4099* (2013.01); *B29C 64/118* (2017.08); *B33Y 10/00* (2014.12); *G05B 2219/49023* (2013.01)

(58) Field of Classification Search
USPC .................................................. 700/44, 291
See application file for complete search history.

(56) References Cited

U.S. PATENT DOCUMENTS

| | | |
|---|---|---|
| 2004/0038009 A1 | 2/2004 | Leyden et al. |
| 2013/0171431 A1 | 7/2013 | Swartz et al. |
| 2014/0361460 A1 | 12/2014 | Mark |
| 2015/0314531 A1 | 11/2015 | Mark et al. |

OTHER PUBLICATIONS

USPTO, Notice of Allowance, U.S. Appl. No. 15/069,440, dated Jul. 10, 2018.
USPTO, Office action, U.S. Appl. No. 15/069,440, dated Feb. 9, 2018.

*Primary Examiner* — Robert E Fennema
*Assistant Examiner* — Marzia T Monty
(74) *Attorney, Agent, or Firm* — McGeary Cukor LLC; Kenneth Ottesen; Jason Paul DeMont

(57) ABSTRACT

A system and method for additive manufacturing of otherwise thermosetting polymers, such as PAI, is disclosed. The system includes fast-curing hardware that facilitates curing each deposited layer before a successive layer is deposited. This reduces the time to provide a finished part from weeks to hours.

22 Claims, 7 Drawing Sheets

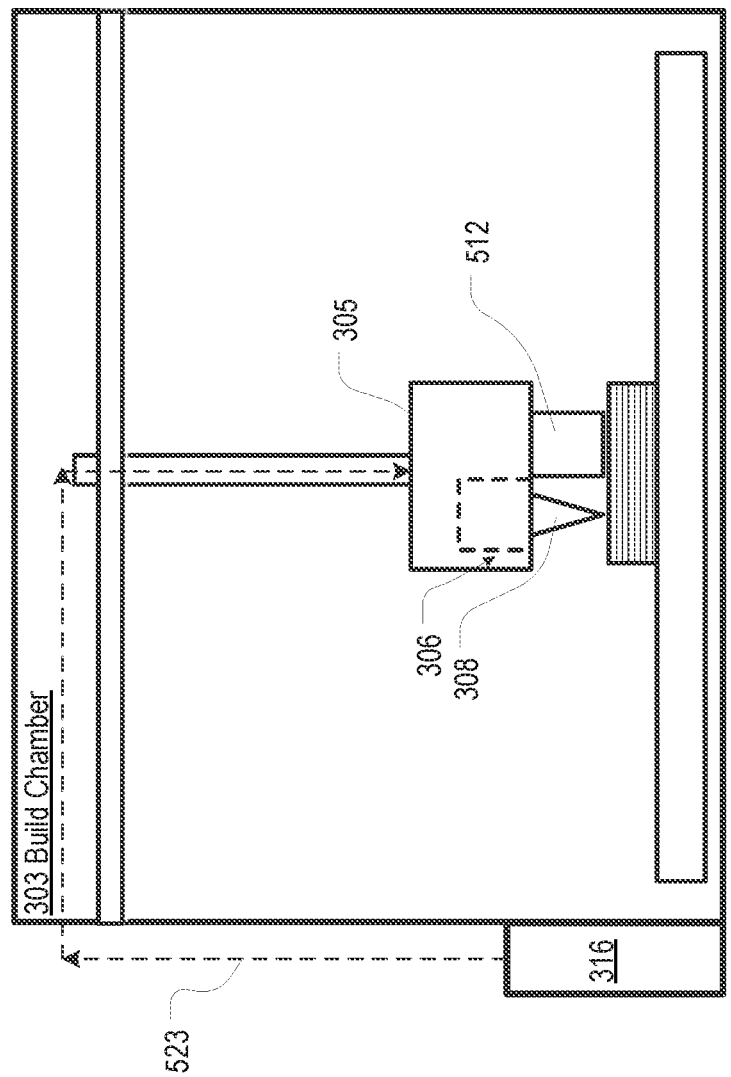

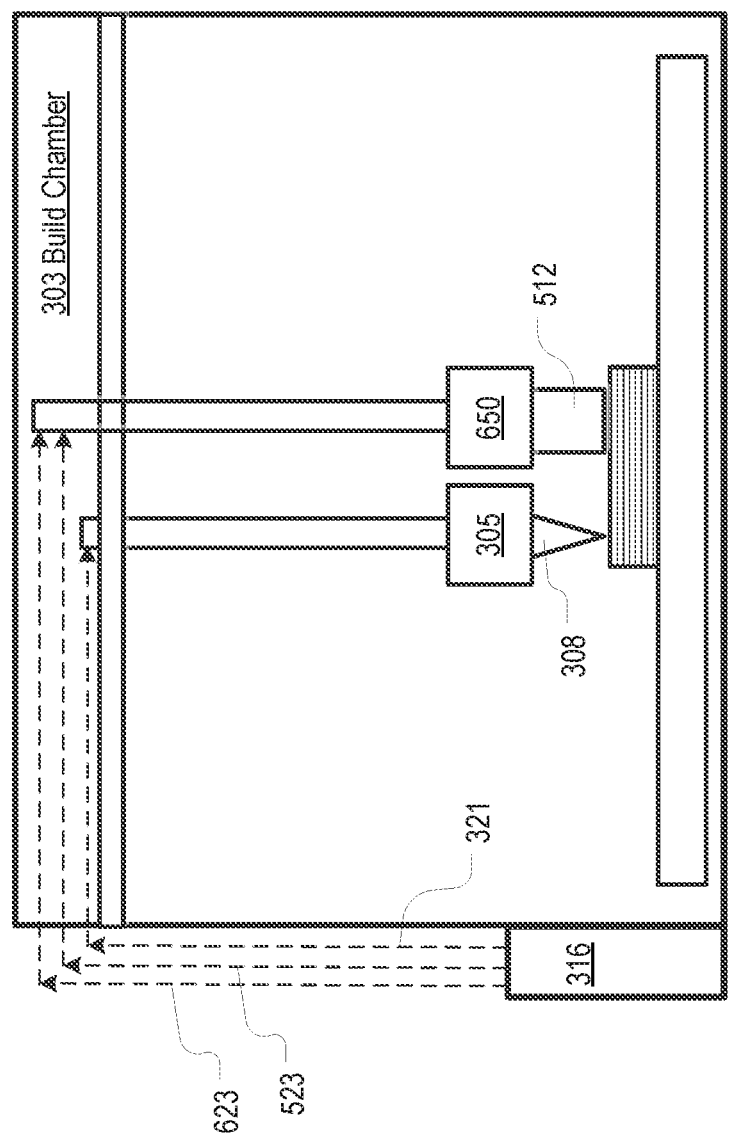

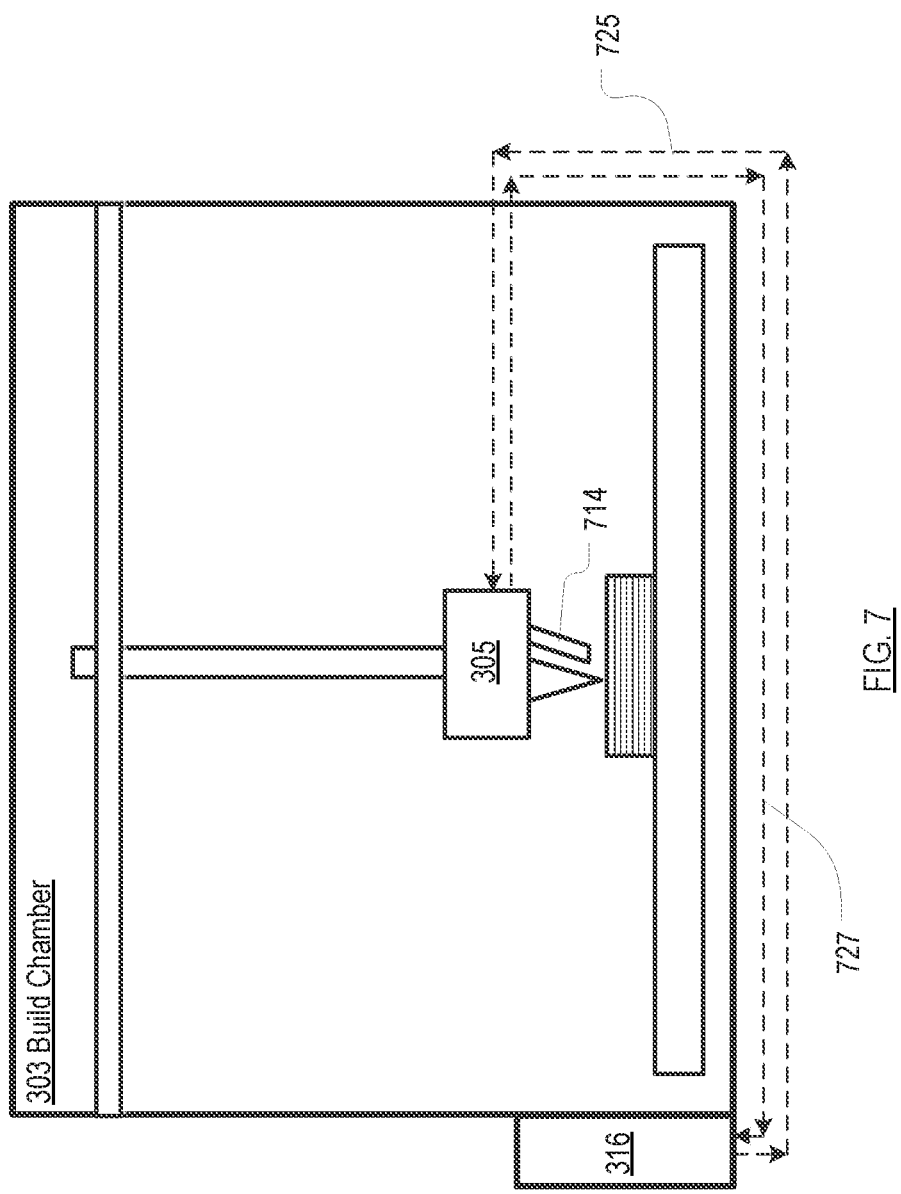

SYSTEM AND METHOD FOR ADDITIVE MANUFACTURING WITH LAYER-BY-LAYER CURING

STATEMENT OF RELATED CASES

This case claims priority of U.S. Patent Application Ser. No. 62/133,237 filed Mar. 13, 2015 and which is incorporated by reference herein.

FIELD OF THE INVENTION

The present invention relates to additive manufacturing, also known as 3D printing.

BACKGROUND OF THE INVENTION

The additive manufacturing process is widely known as the three-dimensional ("3D") printing of objects. Numerous methodologies for 3D printing have been described in prior art, the most common of which include solid-laser-sintering (SLS), stereolithography (SLA), and extrusion-based 3D printing or FFF (fused filament fabrication). All of these methods involve the deposition of thin layer of thermoplastic or thermoset materials.

Prototyping is the most common application for additive manufacturing, using materials such as ABS (acrylonitrile butadiene styrene), Nylon (Polyamide), and PLA (polylactic acid). More recently, 3D printing has been utilizing high performance polymers such as PEI, PPSU, PEEK, etc., as well as metals and ceramics with greater mechanical, chemical, thermal and electrical properties.

PAI is a specialty thermosetting polymer that has the highest strength and stiffness of any thermoplastic polymer. PAI is characterized by good wear, low creep, and excellent chemical and heat resistance; it maintains its mechanical properties up to 275° C. Given its exceptional high-temperature performance, PAI is used in extreme environments for aerospace, defense, and other applications.

The main drawback of PAI is the very lengthy post-curing cycle requiring a complex, programmable oven. According to Solvay's Torlon® processing guide, a portion of which is reproduced as Table 1 below, objects or parts (hereinafter simply "objects") with thicknesses up to and including 7.6 millimeters (mm) require a 17-day cure schedule involving eight temperature cycles. For larger objects up to 15.9 mm thick, a 23-day cure schedule with ten temperature cycles is required. There are no recommended guidelines for objects thicker than 15.9 mm. If a PAI-based object is machined after curing, then it must undergo a re-curing cycle.

TABLE 1

| Time and Temperature as a function of Thickness For a PAI-based Object | | | |
|---|---|---|---|
| Maximum X-sectional thickness of object <mm> | Days at Temp. | Cumulative Days | Cure Temperature <° C.> |
| 7.6 | 1 | 1 | 149 |
|  | 1 | 2 | 191 |
|  | 1 | 3 | 204 |
|  | 1 | 4 | 218 |
|  | 1 | 5 | 232 |
|  | 1 | 6 | 243 |
|  | 1 | 7 | 252 |
|  | 10 | 8-17 | 260 |
| 7.6 < $X_{sect}$ ≤ 15.9 | 1 | 1 | 149 |
|  | 1 | 2 | 177 |
|  | 1 | 3 | 191 |
|  | 1 | 4 | 204 |
|  | 1 | 5 | 218 |
|  | 2 | 7 | 232 |
|  | 3 | 10 | 243 |
|  | 2 | 12 | 249 |
|  | 1 | 13 | 254 |
|  | 10 | 23 | 260 |

FIG. 1 depicts a flow diagram of prior-art additive manufacturing method 100 for producing a polyamide-imide based object.

Per task 101 of method 100, a 3D model of the object is generated. To create a 3D printable model of a new (non-existing) object, a computer aided design (CAD) package is used to create a digital file (mathematical model) of the object. For an existing object (sculpted or otherwise), a 3D scanner or a digital camera with photogrammetry software is typically used. These latter two approaches collect digital data on the shape and appearance of the real object and then use that data to create the digital file of the object in known fashion.

The digital file/mathematical model must be further processed prior to printing the object. In particular, in task 102, "slicing software," typically executing on a computer physically separate from the 3D printer, is used to "slice" the 3D model into many (typically hundreds or thousands) of horizontal (2D) layers. The slicing software analyzes the 3D model to determine what "G-code" commands (the instruction set used by most 3D printers) can be used to reproduce the model.

The slicing software generates the G-code instructions based on rules determined by parameters/values provided by the operator/designer along with algorithms within the slicing software itself. Parameters such as filament size, extrusion width, speed of the print head, among others are used to develop the G-code instructions. Once the complete instruction set (the build instructions) is generated, it is transmitted to the 3D printer.

In task 103, the 3D printer deposits material (PAI), corresponding to each "slice," in sequential fashion in accordance with the build instructions (G-code instruction set). Query, in task 104, whether all layers required for building the object have been deposited. If not, processing loops back, via 105, to task 103 wherein a subsequent layer is deposited per the build instructions.

When all layers are deposited the build is complete and, at task 106, the object is cured.

The post-curing process is unique to PAI resins. The resins start at a low molecular weight, which enables the resin to be processed, injection molded, and extruded. After an object is molded but before its cured, it exhibits very poor mechanical, thermal, electrical, and chemical properties due to its short polymer chains. During the post-curing process, the heat supplied to the object causes the end amic acid groups to form imides generating water as a byproduct. This chemical process occurs at the ends of the short chains, chemically bonding them together resulting in chain extension, cross-linking, and branching.

The reaction is limited by the diffusion of water from the object. The thicker the object, the further the water must diffuse and the longer the required post-curing time.

The art would therefore benefit from a way to reduce the manufacturing lead-time of a PAI-based object. The art would also benefit from a way to build much larger PAI-based objects than is currently practicable given the size limitations that arise from the post-curing process.

SUMMARY OF THE DISCLOSURE

The present invention provides an apparatus and method that significantly reduces the manufacturing lead-time for objects comprising slow-curing thermoset polymers, such as polyamide-imide, made via additive manufacturing (i.e., 3D printing). Embodiments of the invention also facilitate the manufacture of PAI-based objects that are significantly larger than those made using existing processes.

In accordance with the illustrative embodiment, a PAI-based object is cured during the build process. As previously discussed, the time required for post-curing process, as in the prior art, is dictated by the time it takes for water to diffuse out of the printed object during chain extension (curing). A thicker object therefore requires a longer curing time compared to a thinner object because of the longer diffusion length for the water generated at the center of the object.

The present inventors realized that if a "growing" PAI-based object could be cured during manufacture, such as on a layer-by-layer basis during the deposition process, the curing process ought to be greatly accelerated relative to the time required to cure a fully formed object. In particular, the thickness or cross-section of material that is extruded from a standard off-the-shelf fused filament fabrication nozzle ranges from about 0.25 mm to 1 mm, which represents a small fraction of the finished object having a thickness of 15.9 mm, for example. In fact, the cure time for a PAI extrudate having a thickness of 0.25 mm to 1 mm is in the range of seconds to minutes, as compared to weeks for a PAI-based finished object The integrated deposition/curing process, as taught herein, might take somewhat longer than the deposition processes of the prior art. This is because in accordance with at least some embodiments, a layer of PAI extrudate must be deposited and cured before the next layer is deposited. However, at the end the process described herein, the PAI-based object is fully cured and ready for use. This is in marked contrast to the prior art wherein, after the deposition process is complete, a several week PAI-curing process begins. Consequently, the processing time to obtain a fully-cured and ready-to-use PAI-based object is greatly reduced using the apparatus and methods disclosed herein.

To achieve proper curing of PAI in-situ, specialized software and hardware are required. More particularly, in the illustrative embodiments, the "curing hardware" includes a localized heating system and thermal monitoring system to maintain the appropriate curing temperatures throughout the build process. The heating system includes one or more sources of heat. The thermal monitoring system includes one or more devices that are suitable for monitoring the temperature of the build chamber or the region nearest the deposited layer as well as one or more timing devices that, in conjunction with the software, determine and report the length of time that a deposited layer is exposed to temperature. These systems ensure that the proper curing temperature is achieved and maintained for each layer or segment of material that is deposited and further enables temperature profiles over time to be obtained for each segment or layer throughout the entire build process.

In addition to monitoring the cure of each deposited layer by time, the curing hardware also includes one or more devices that are capable of obtaining an analysis of the deposited layer after the curing step. In some embodiments, the data obtained is compared to reference data stored in a curing database to determine whether the layer is fully cured or, if not, to determine the extent (percentage) of curing. Based on the results of the comparison, either the deposited layer is subjected to further curing or, if fully cured, a subsequent layer is deposited in accordance with the build instructions.

Curing software includes, in addition to any other software or database, the curing database as well as analysis software that: (i) determines the minimum curing time and temperature per layer or segment based on one or more of the extrusion nozzle size, nozzle temperature, extrusion speed, and minimum curing temperature and time per thickness, (ii) and that stores (at least temporarily) the results of analysis of the deposited layer, (iii) stores time and temperature information pertaining to curing for each deposited layer, and (iv) performs the comparison between the analysis and the curing database. It will be appreciated that the analysis software may be one or more separate software applications, running on the same or different processors.

BRIEF DESCRIPTION OF THE DRAWINGS

FIG. 5 depicts a second embodiment of the localized heating system for use in conjunction with the system of FIG. 3.

FIG. 6 depicts a third embodiment of the localized heating system for use in conjunction with the system of FIG. 3.

FIG. 7 depicts an embodiment of an analysis system for obtaining a measurement of a characteristic of the deposited layer use in conjunction with the system of FIG. 3.

DETAILED DESCRIPTION

As discussed in the Background section, embodiments of the invention significantly reduce manufacturing lead-time for the fabrication, via additive manufacturing, of parts (or, more generally, "objects") using thermosetting polymers, such as polyamide-imide. Additionally, embodiments of the invention also facilitate the manufacture of parts/objects comprising thermosetting polymer that are significantly larger than those made via existing processes.

In the illustrative embodiment, a modified fused filament fabrication (FFF) system and method are used to fabricate ("print") the thermoset polymer-based objects. However, in light of this disclosure, those skilled in the art will be able to modify, as required, other additive-manufacturing apparatuses and processes, such as SLS or modified SLA, to print PAI-based objects in accordance with the present teachings.

Embodiments of the invention are directed to a system and process for the rapid curing of 3D-printed objects made from PAI. However, it will be appreciated by those skilled in the art that the illustrative system and process is equally useful for the fabrication of objects, via additive manufacturing, that are made from other thermoset polymers, such as, without limitation, polyesters, polyurethanes, polyimides, and epoxies, all of which require a lengthy post cure.

In some embodiments in accordance with the invention, multiple materials are used to construct a single object, wherein one of the materials is PAI. The inclusion of PAI provides a high level of mechanical strength to the object. Because of the high moisture absorption of PAI, in some embodiments, the outside of the PAI object is covered with a low moisture-absorbing polymer, such as PEEK. By printing PEEK over a PAI object, the moisture absorption is reduced, resulting in a more geometrically consistent object over its lifetime.

Figure 2:
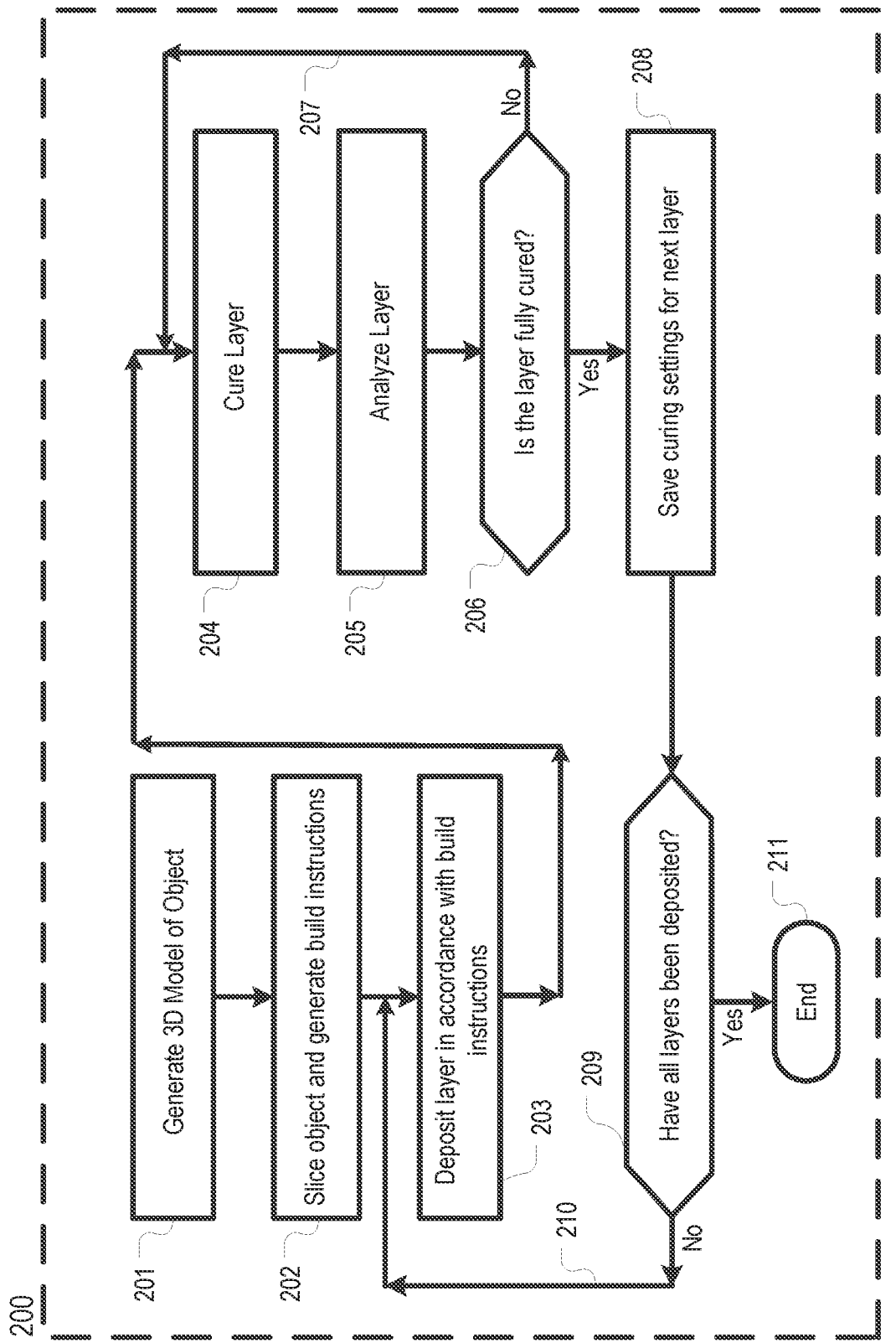
FIG. 2 depicts a flow diagram of a polyamide-imide based additive manufacturing method in accordance with the illustrative embodiment of the present invention.

FIG. 2 depicts a flow diagram of additive manufacturing method 100 for producing a polyamide-imide based object in accordance with the illustrative embodiment of the present invention.

Figure 1:
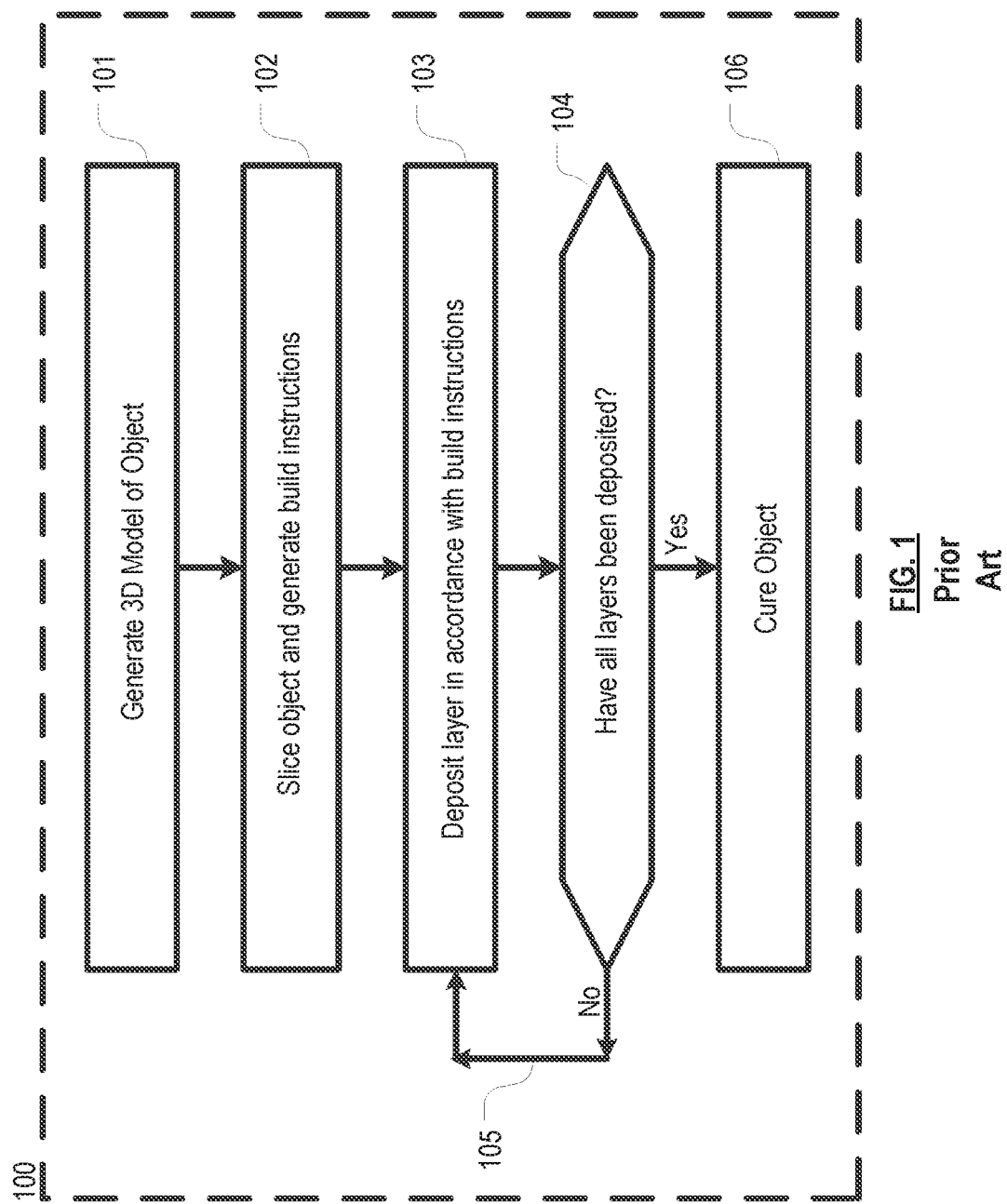
FIG. 1 depicts a flow diagram of a prior-art polyamide-imide based additive manufacturing method.

The first three tasks of the process—tasks 201, 202, and 203—are the same as in prior-art method 100 depicted in FIG. 1 and have been previously discussed. Those tasks include generating a 3D model of the object, slicing the object and generating build instructions, and depositing a layer in accordance with the build instructions.

At task 204, unlike the prior art, the layer of PAI that was deposited in task 203 is cured prior to depositing a subsequent layer. Curing the deposited layer requires time at temperature. To this end, a 3D printer in accordance with the illustrative embodiment (see, e.g., FIG. 3, etc.) includes "fast-cure hardware," which is defined for use in this disclosure and the appended claims as hardware that facilitates layer-by-layer curing of objects formed from slow curing polymers, such as, without limitation, PAI.

In the illustrative embodiment, and as discussed further in conjunction with FIGS. 4 through 7, the fast-cure hardware comprises a localized heating system, a thermal monitoring system, and an analysis system. In addition to other functionality discussed below, the curing hardware (in particular the localized heating system and thermal monitoring system) enables the temperature of the nascent PAI-based object to be adjusted to and maintained at the appropriate curing temperature(s) throughout the build process. Task 204 is timed (e.g., via a timer and software, etc.) to meet a minimum curing time and to record the actual curing time of each layer. In the illustrative embodiment, curing temperature is maintained at a single temperature, which is 260° C.

The curing of PAI is limited by the rate of diffusion of water out of a PAI-based object, as previously discussed. For the prior art, this diffusion limitation results in a standard minimum cure time of 17 days for an object having a thickness of 7.6 mm (or less). The curing of the material occurs primarily at 260° C. However, to avoid swelling of the object and loss of dimensional accuracy, in the prior art, the object must be heated slowly to curing temperature over a 7-day heating cycle, as shown in Table 1 in the Background section.

In method 200 in accordance with the present teaching, each successive layer of PAI is cured immediately after solidification from the melt phase and prior to depositing the next layer. This improvement:

negates the need for a lengthy (7-day) heat-up cycle;
significantly reduces the curing time at 260° C. relative to the standard cure time for PAI since in method 200, a single build layer (c.a. 0.05 to 0.3 mm) is being cured rather than a finished object (c.a. 10 mm);
negates the limitation (15.9 mm) on the maximum thickness of the printed object, since, in the illustrative embodiment, water is removed on a layer-by-layer basis.

Estimate of Curing Time.

Water diffusion through a polymer is generally assumed to be constant as described by Fick's second law.

$$\frac{\partial C}{\partial t} = \nabla \cdot (D \nabla C) \qquad [1]$$

where: D ($mm^2/s$) is the diffusion constant,
C ($g/mm^3$) is the moisture concentration, and
t (s) is time.

For a one-dimensional case, expression [1] can be solved and integrated to yield the following expression:

$$\frac{M_t}{M_\infty} = 1 - \frac{8}{\pi^2} \sum_{n=0}^{\infty} \frac{1}{(2n+1)^2} \exp\left(\frac{-D(2n+1)^2 \pi^2}{4l^2} t\right) \qquad [2]$$

Where: l is the part thickness,
$M_t$ is the mass of moisture after absorption time t, and
$M\infty$ is the mass of saturated sample.

In conjunction with the PAI processing guide, etc., expression [2] can be used to provide an estimate of curing time. Using the same mass of moisture after absorption, expression [2] reduces to:

$$\frac{x_1^2}{t_1} = \frac{x_2^2}{t_2} \qquad [3]$$

As previously disclosed, in accordance with method 200, a single layer of extrudate is cured in task 204. Standard layer height for the deposited layer in additive manufacturing is about 0.1 mm. It is known from the PAI processing guide that a part/object that is no more than 7.6 mm thick requires a curing time of 10 days (after a 7-day heating cycle).

The information can be substituted into Expression [3], solving for $t_2$, curing time for the 0.1 mm layer, as follows:
$x_1$=7.6 mm and $t_1$ (curing time)=10 days.
$x_2$=0.1 mm and $t_2$ (curing time) is unknown.

$$\frac{(7.6 \text{ mm})^2}{10 \text{ s}} = \frac{(0.1 \text{ mm})^2}{t_2}$$

$t_2$=0.00173 days=2.5 minutes.

Thus, the estimated time it takes to cure a single layer of extrudate is about 2.5 minutes. Ignoring deposition time, and assuming that for 0.1 mm deposited layers, 76 layers are required to build a 7.6 mm object, 2.5 minutes per layer×76 layers or 3.2 hours are required to produce a fully-cured, ready-to-use object. The prior art requires a 17-day curing cycle for an object having a thickness of 7.6 mm (or less).

Task 204 is time to provide a minimum cure time. However, to ensure that the layer is cured, in task 205, the "cured" layer is analyzed to determine, per task 206, whether the layer is actually fully cured. In the illustrative embodiment, the analysis determines the extent to which the polymer is cured (e.g., percentage cured, etc.).

In task 205, the analysis obtains a measure/value of a characteristic of the deposited layer that has previously been correlated to the extent of cure (or, at a minimum, provides an indication of whether the PAI is cured or not). The measurement is compared to a "curing database." The curing database relates the extent-of-cure of PAI to values of the characteristic, thus providing a reference for comparison. The comparison of the measured value with the reference information provides an estimate for the extent-of-cure for the deposited layer. Alternatively, an expression can be developed or otherwise obtained that relates the value of the characteristic to the extent of cure of the PAI. If not otherwise available, the curing database can be developed by an operator of the system disclosed herein by performing a simple parametric study.

Typically, task 205 will be performed via either visual inspection or via small angle x-ray scattering (SAXS).

With respect to visual inspection, as PAI cures, oxidation of its surface causes its color to darken. Visual images of the layer can be obtained and analyzed to determine the extent of curing for a given layer or segment. In some embodiments, a high definition color camera detects the color profile of the surface of the deposited layer (i.e., the polymer). A curing database stores a version of a photo-chart that relates the color profile of the surface to the extent (e.g., percent) to which PAI polymer is cured. The database includes the color profile for a number of stages (about 10 or so) during the curing process. Stage 1, for example, would show a light yellowish-amber colored surface indicating no curing has taken place, while stage 10 would show a dark brown colored surface indicating the surface is fully cured.

Relative to visual inspection, small angle x-ray scattering is more accurate in determining the extent of curing of the PAI polymer but is also more costly. In SAXS, a monochromatic beam of X-rays is directed at the sample. (the layer of PAI). Most of the X-rays go through the sample, but some scatter, forming a scattering pattern. The pattern, which is detected at a detector, contains information about the structure of the sample. For this application, SAXS is used to determine the molecular weight of the PAL During the curing process of PAI, polymer chains link together, thereby increasing the molecular weight of the compound. For this embodiment, the curing database contains reference data that relates the molecular weight of the PAI to the extent to which it is cured.

Thus, using either approach, the data from the analysis of the layer is stored at least temporarily in processor accessible storage and compared to the database information to determine the extent of cure. These task are performed by analysis software. If the layer is not fully cured, the analysis software can estimate the time remaining for full cure, such as based on based on historical data if available or via quadratic extrapolation (see, e.g., Expression [3]).

As used in this disclosure and the appended claims, the phrase "curing data" refers to a value/measure of a characteristic of a deposited polymer layer that correlates to the extent to which the polymer is cured.

If the answer to the query at task 206 (is the layer fully cured?) is "no," processing loops back at 207 to task 204, for additional curing. If the answer to the query at task 206 is "yes," then at task 208, the curing settings (i.e., time at temperature) are stored so that they can be used as the basis for curing the next layer of PAI deposited by the 3D printer. In some embodiments, the full time/temperature history of each layer, including the extent-of-cure information as appropriate, is archived. Such archived data enables further refinements to the timing of the curing step (e.g., it can be used to determine how much additional curing time is required for full cure given a particular extent-of-cure estimate, it can be used to estimate an increase the nominal period of time allotted for curing, etc.).

Query, at task 209, whether all layers of material have been deposited in accordance with the build instructions. If the answer to the query is "yes," processing ends at task 211. If the answer to the query at task 209 is "no," then processing loops back at 210 to task 203, wherein another layer of PAI is deposited in accordance with the build instructions.

Figure 3:
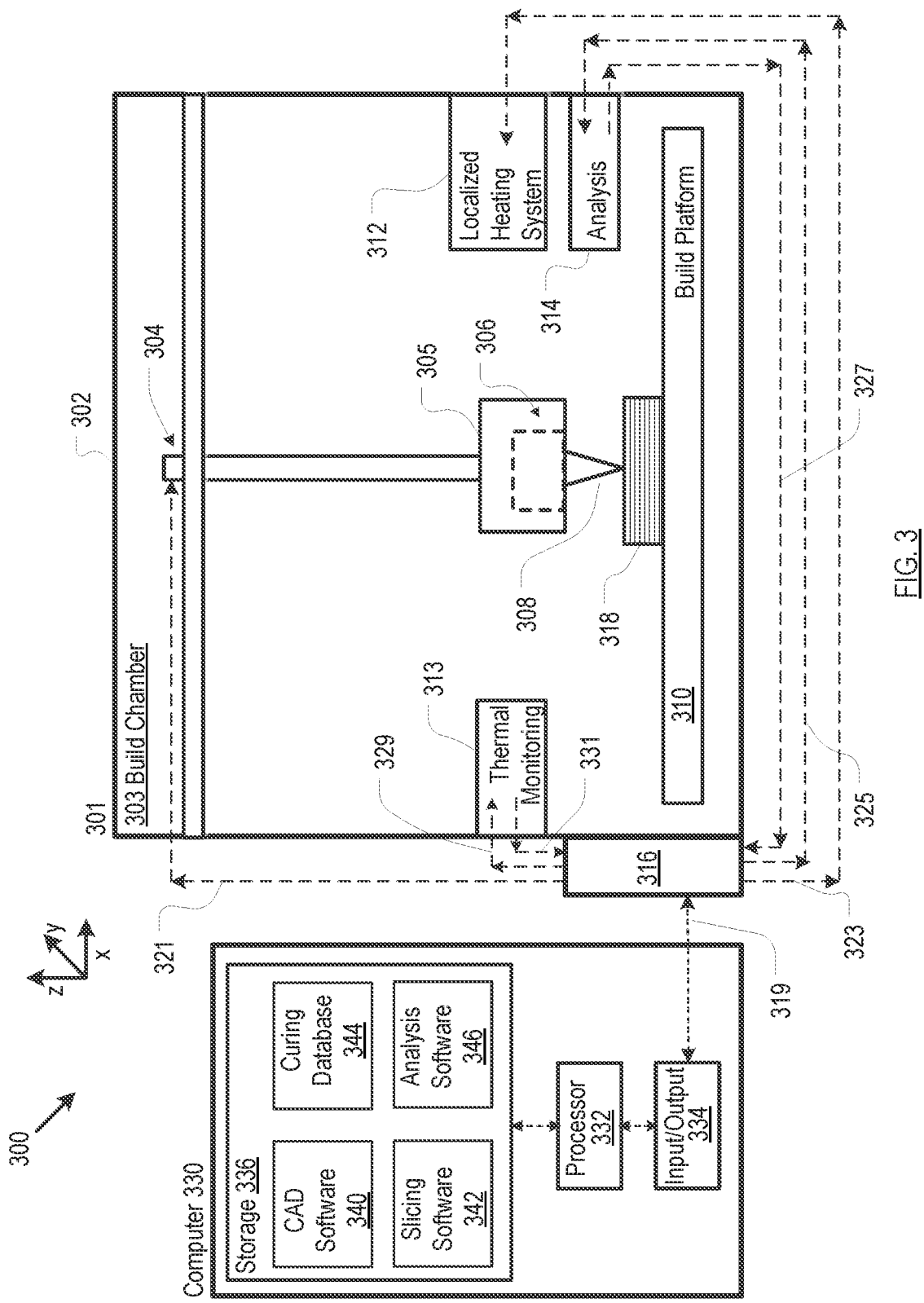
FIG. 3 depicts a system for printing and rapid curing of PAI-based objects in accordance with the illustrative embodiment of the present invention.

FIG. 3 depicts system 300 for printing and rapid curing of PAI-based objects in accordance with an illustrative embodiment of the invention. In the illustrative embodiment, system 300 operates in accordance with method 200. The salient elements of system 300 depicted in FIG. 3 include 3D printer 301 and computer 330, which are in communication with one another via link 319, which can be wired or wireless utilizing any appropriate telecommunications protocol.

Computer 330, which in some embodiments is a physically distinct device from 3D printer 301, includes processor 332, input/output 334, and processor accessible storage 336.

Processor 332 is a general-purpose processor that is capable of, among other tasks, executing an operating system and executing specialized application software used in conjunction with the embodiments of the invention. Processor 310 is also capable of populating, updating, using, and managing data in processor-accessible data storage 336. In some alternative embodiments of the present invention, processor 332 is a special-purpose processor. It will be clear to those skilled in the art how to make and use processor 332.

Processor-accessible data storage 336 is non-volatile, non-transitory memory technology (e.g., ROM, EPROM, EEPROM, hard drive(s), flash drive(s) or other solid state memory technology, CD-ROM, DVD, etc.) that stores, among any other information, data (such as curing data, curing time and temperature history for each deposited layer, etc.) and specialized application software, which, when executed, enable processor 332 to generate instructions for 3D printer 301 and analyze curing data, among other tasks. It will be clear to those skilled in the art how to make and use processor-accessible data storage 312.

Specialized application software executed by processor 332 and stored in processor accessible storage includes, without limitation, CAD software 340, slicing software 342, curing database 344, and analysis software 346. CAD software 340 and slicing software 342 have been previously discussed in conjunction with generating build instructions for controller 316. Curing database 344 and analysis software 346 have been discussed in conjunction with determining the extent-of-cure of a deposited layer of PAI. In some embodiments, analysis software 346 also estimates the minimum curing time and temperature per layer or segment based on one or more of nozzle size, nozzle temperature, extrusion speed, and minimum curing temperature and time per thickness, in known fashion. See, e.g., the previous discussion pertaining to estimating curing time. After determining the minimum layer time and temperature, the deposition and travel rates may be adjusted accordingly to synchronize the curing time with the build time. In such an embodiment, the object construction is timed to finish when the part is fully cured.

Input/output 334 enables communications with, for example and without limitation, a human operator, controller 316 of 3D printer 301, and optionally the Internet. Communications can be via any appropriate medium, including wireline and/or wireless, and via any appropriate protocol (e.g., Bluetooth, Wi-Fi, cellular, optical, ultrasound, etc.). The term "input/output" is meant to include a transceiver or any communications means and, as appropriate, various supporting equipment, such as communications ports, antennas, etc. It will be clear to those skilled in the art, after reading this specification, how to make and use input/output 334.

System 300 "prints" objects utilizing fused filament fabrication processing, wherein filaments of material—in this embodiment PAI—are extruded from an extrusion head. Using this method, a part or object is constructed layer-by-layer through controlled deposition of the extrudate (i.e., the material exiting the nozzle of the extrusion head). The nozzle has an opening with a diameter in the range of about 0.25 to 1 mm, which produces an extrudate having a typically circular cross-section of like or somewhat smaller diameter or layer height (as small as about 0.1 mm).

3D printer 301 includes housing 302, which defines build chamber 303. Fixture 305, which is movably supported by gantry 304, supports extrusion head 306, which includes nozzle 308. Gantry 304 enables movement of nozzle 308 in the X direction (left and right in FIG. 3) and Y direction (backward or forward in FIG. 3). Below nozzle 308 is build plate 310, upon which nozzle 308 deposit successive layers of extrudate to build object 318. Build plate 310 is movable in the Z direction (i.e., up and down in FIG. 3), providing 3 degrees-of-freedom to the build.

3D printer 301 also includes controller 316. The controller reads and executes commands from the G-code generated from outboard computer 330. For example, controller 316 orchestrates the build of object 318, based on build instructions received from computer 330, by controlling gantry movement and build plate movement, extrusion rate, and build plate and nozzle temperature via control signal(s) 321. Computer 330 generates the build instructions using, for example, CAD software 340 (for generating a 3D model of the object) and slicing software 342 (for "slicing" the 3D model into planar segments and generating the G-code instruction set).

In accordance with the present teachings, 3D printer 301 also includes fast-cure hardware, including localized heating system 312, thermal monitoring system 313, and analysis system 314. In conjunction with curing database 344 and analysis software 346, which are stored in processor-accessible storage 336, the fast-cure hardware facilitate the rapid curing of PAI-based objects that are printed by 3D printer 301.

More particularly, localized heating system 312, in conjunction with thermal monitoring system 313, maintains the appropriate curing temperature throughout the build process. Localized heating system 312 includes a heat source, such as, without limitation, one or more: infrared heat lamps, lasers, heat guns, heat cartridges, etc. Controller 316 controls localized heating system 312 via control signal 323. This communications link, and other links between other equipment, can be either wireline or wireless using an appropriate telecommunications protocol.

Thermal monitoring system 313 comprises a temperature-measuring device, such as, without limitation, one or more: thermocouples, resistance temperature devices, infrared temperature measurement devices, bimetallic temperature measurement devices, fluid-expansion temperature measurement devices, change-of-state temperature measurement devices, etc. Controller 316 controls thermal monitoring system 313 via control signal 329.

The temperature measured by thermal monitoring system 313 is reported to controller 316 over link 331. As necessary, controller 316 then adjusts the heat provided by localized heating system 312 to maintain a desired curing temperature in build chamber 303 or at least in the immediate vicinity of the deposited layer on nascent object 318.

Analysis system 314 is capable of obtaining curing data of the deposited layer of PAI. Controller 316 controls analysis system 314 via control signal 325.

In some embodiments, the curing data obtained by analysis system 314 is reported to controller 316 over link 327 and then to computer 330 for at least intermediate storage in storage registers designated for processing results. Processor 332 in computer 330 compares, via analysis software 346, the curing data to information in curing database 344. The comparison provides an estimate of the extent to which the deposited layer is cured.

Based on the outcome of the analysis, analysis software 346, executing on process 332, generates additional instructions for 3D printer 301. For example, the instructions might be to continue localized heating (curing) for a certain period of time to finalize an incomplete cure, or it might be to continue the build by depositing a subsequent layer. The additional time for curing can be estimated based on the determination of extent-of-cure and historical data (which can provide the time required to advance from the present state of cure to a complete cure). The instructions are transmitted from processor 332 via I/O 334 to controller 316, which then directs the operation of 3D printer 301 pursuant to the instructions.

In an alternative embodiment, analysis of the curing data is performed by an analyzer associated with controller 316, wherein the analyzer determines is the curing step needs to be prolonged or not.

It will be appreciated that all of the processing discussed above can take place either in computer 330 or in a processor associated with controller 316 in 3D printer 301 or processing can be distributed so that it is performed partially, to any extent, in both locations.

Figure 4:
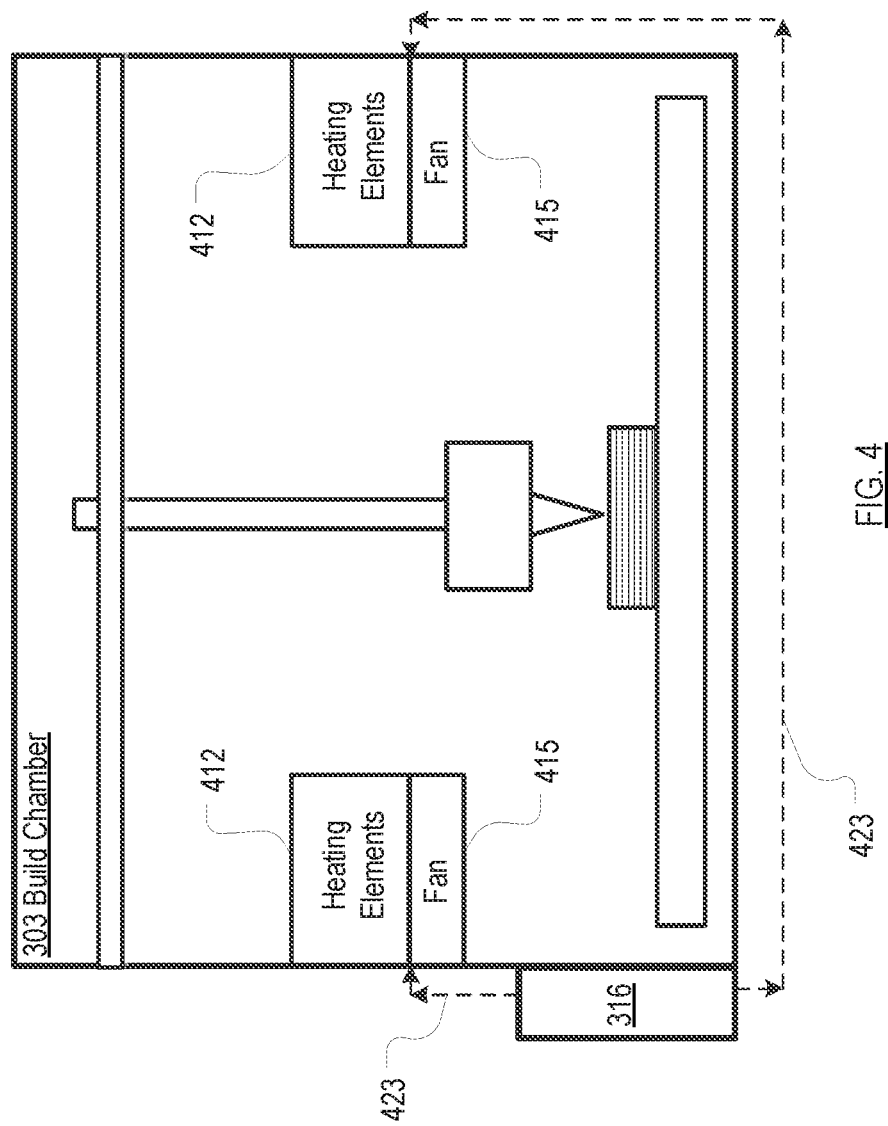
FIG. 4 depicts a first embodiment of the localized heating system for use in conjunction with the system of FIG. 3.

FIGS. 4 through 6 depict several embodiments of localized heating system 312. Only elements that are germane to the localized heating system are identified in these Figures and discussed.

FIG. 4 depicts an embodiment wherein the entire build chamber 303 is heated to the required curing temperature using one or more heating elements 412 (e.g., infrared heat lamp, laser, heat gun, heat cartridges, etc.). Fan 413 is disposed in the immediate vicinity of the heating element(s) 412 to distribute the heat throughout build chamber 303. Heating element(s) 412 and fan(s) 413 are controlled by separate control signals, which are depicted, for simplicity, as single control signal 423.

FIG. 5 depicts an embodiment wherein one or more heating elements 512 (e.g., infrared heat lamp, laser, heat gun, heat cartridges, etc.) are mounted near nozzle 308 on the same fixture (fixture 305) as PAI extrusion head 306 for targeted curing. As the extrusion head lays down PAI, the heating element follows behind, heating and curing the deposited extrudate. In this regard, in some embodiments, the fixture/extrusion head can rotate 360 degrees so that heating element 512 is always following nozzle 308. Controller 316 controls heating element(s) 512 via control signal 523.

In some other embodiments, the fixture/extrusion head is not rotatable; rather, there are multiple heating elements 512 positioned around nozzle 512. In some such embodiments, the heating elements are controlled collectively such that all heating elements 512 are active at the same time, thereby heating/curing material ahead of, behind, and to the sides of nozzle 308. In some other of such embodiments, heating elements 512 are individually controllable such that they can be selectively activated, for example, to heat/cure only the material that is behind nozzle 308, etc.

In some embodiments, if the extrudate cross-section is small enough to enable curing immediately following material deposition, the curing and object construction effectively occur simultaneously. However, if additional curing time is required, the head can move across the same layer or segment any number of times without extruding until that section is fully cured from the exposure to heat.

FIG. 6 depicts an embodiment wherein one or more heating elements 512 (e.g., infrared heat lamp, laser, heat gun, heat cartridges, etc.) are mounted on one or more fixtures 650 that are independent from fixture 305 that supports extrusion head 306. In such embodiments, the one or more heating elements 512 move independently of extrusion head 306, enabling targeted curing of multiple regions of the object during the build process. This embodiment might result in faster curing rates compared to the embodiment depicted in FIG. 5 wherein heating element(s) 512 are mounted on the same fixture as extrusion head 306.

System software instructs controller 316 to coordinate the movements of the heating elements 512 (via control signal 623) and extrusion head 306 (via controls signal 321) to avoid collision and ensure each layer or segment is subject to the calculated minimum curing time. Controller 316 controls the heating operation of heating element(s) 512 via control signal 321.

FIG. 7 depicts an embodiment of analysis system 314, wherein high definition color camera 714 is disposed on the same fixture (fixture 305) as extrusion head 306. Controller 316 controls the operation of camera 714 by control signal 725. The curing data obtained by camera 714 is transmitted over link 727 to controller 316 and then to computer 330 (not depicted in FIG. 7) for intermediate storage and processing via software.

It is to be understood that although the disclosure teaches many examples of embodiments in accordance with the present teachings, many additional variations of the invention can easily be devised by those skilled in the art after reading this disclosure. As a consequence, the scope of the present invention is to be determined by the following claims.

What is claimed is:

1. A system for additive manufacturing with layer-by-layer curing, comprising:
 a build chamber;
 a print head disposed in the build chamber, wherein the print head deposits a polymer material, wherein the print head is coupled to a structure that moves and supports the print head;
 a build plate disposed in the build chamber, wherein the build plate receives plural layers of the polymer material from the print head, one layer deposited upon the next;
 a controller for controlling the deposition of the layers of polymer material; and
 fast cure hardware, responsive to a measured characteristic of the polymer material, wherein the fast cure hardware enables each layer of polymer material to be fully cured before a successive layer thereof is deposited thereon, and wherein the fast cure hardware comprises a localized heating system disposed in the build chamber independently of the print head.

2. The system of claim 1 wherein the localized heating system raises a temperature within at least a portion of the build chamber to a curing temperature of the polymer material.

3. The system of claim 2 wherein the localized heating system moves in concert with the print head.

4. The system of claim 2 wherein the localized heating system comprises a heating element, and wherein the heating element is coupled to the structure independently of the print head, enabling the heating element to move independently of the print head.

5. The system of claim 1 wherein the fast cure hardware further comprises a thermal monitoring system that determines and reports the temperature to a processor.

6. The system of claim 5 wherein when there is a variation between the reported temperature and the curing temperature, the controller adjusts the operation of the localized heating system to reduce the variation.

7. The system of claim 1 wherein the fast cure hardware further comprises a camera for obtaining curing data of each layer of polymer material before a successive layer of polymer material is deposited, and for reporting the curing data to a processor.

8. The system of claim 7 wherein the processor compares the curing data to reference data to determine an extent-of-cure of the layer of polymer material.

9. The system of claim 8 wherein:
 a) when the extent-of-cure of the polymer material is determined to be less than a full cure, the processor instructs the controller to continue curing the layer of polymer material; and
 b) wherein when the extent-of-cure of the polymer material is determined to be a full cure, the processor instructs the controller to deposit a subsequence layer of polymer material.

10. The system of claim 7 and further wherein the processor adjusts a rate at which the polymer material is deposited so as to synchronize curing time with a time it takes to build an object by successive deposition of the plural layers of the polymer material.

11. The system of claim 1 wherein the polymer material comprises PAI.

12. The system of claim 1 wherein the structure that moves and supports the print head is a gantry.

13. A method for additive manufacturing with layer-by-layer curing, the method comprising:
 a) depositing a layer of polymer material;
 b) exposing the layer of polymer material to a temperature suitable for curing the polymer material;
 c) measuring at least one characteristic of the layer, resulting in at least one measured characteristic;
 d) determining if the layer of polymer material is cured based upon the at least one measured characteristic of the layer;
 e) depositing a successive layer of polymer material when the deposited layer is determined to be cured;
 f) exposing the successive layer of polymer material to a temperature suitable for curing;
 g) repeating c), d), e), and f) until a final number of layers of polymer material has been deposited, thereby forming a finished and cured object.

14. The method of claim 13 and further wherein the at least one measured characteristic comprises:
 (i) a temperature of the deposited layer, and (ii) an amount of time that the deposited layer has been exposed to the temperature.

15. The method of claim 13 wherein the at least one measured characteristic is a color of the surface of the deposited layer of polymer material.

16. The method of claim 13 and further wherein exposing the layer of polymer material and a successive layer of polymer material to a temperature suitable for curing the polymer material further comprises moving a heating element independently of a print head that deposits the layer and successive layer of polymer material.

17. The method of claim 13 wherein the polymer material is PAI.

18. A system for additive manufacturing with layer-by-layer curing, comprising:
   a) a print head configured for depositing a layer of polymer material;
   b) a localized heating system configured for exposing the layer of polymer material to a temperature suitable for curing the polymer material;
   c) a thermal monitoring system configured for measuring at least one characteristic of the layer, resulting in at least one measured characteristic;
   d) a controller configured for controlling the print head, the localized heating system, and the thermal monitoring system via respective communications links; and
   e) a processor configured for directing the controller via a communications link and for determining if the layer of polymer material is cured based upon the at least one measured characteristic of the layer;
   wherein the print head is further configured for depositing a successive layer of polymer material when the deposited layer is determined by the processor to be cured;
   wherein the localized heating system is further configured for exposing the successive layer of polymer material to a temperature suitable for curing; and
   wherein the controller is further configured for repeatedly controlling the print head, the localized heating system, and the thermal monitoring system until a final number of layers of polymer material has been deposited as determined by the processor, thereby forming a finished and cured object.

19. The system of claim 18 wherein the at least one measured characteristic comprises:
   (i) a temperature of the deposited layer, and
   (ii) an amount of time that the deposited layer has been exposed to the temperature.

20. The system of claim 19 further comprising a camera configured for detecting a color profile, wherein the at least one measured characteristic further comprises a color of the surface of the deposited layer of polymer material as detected by the camera, and wherein the controller is further configured for controlling the camera.

21. The system of claim 18 wherein the localized heating system comprises a heating element configured for exposing the layer of polymer material and a successive layer of polymer material to a temperature suitable for curing the polymer material, and wherein the controller is further configured for moving the heating element independently of the print head.

22. The system of claim 18 wherein the polymer material is PAI.

* * * * *